United States Patent

Grice

[15] 3,690,166
[45] Sept. 12, 1972

[54] APPARATUS FOR MEASURING SUBSURFACE SOIL CHARACTERISTICS

[72] Inventor: C. Fitzhugh Grice, c/o Grice Ocean Engineering, Inc. 7210 Hemlock, Houston, Tex. 77012

[22] Filed: May 9, 1969

[21] Appl. No.: 823,275

[52] U.S. Cl. ..........................73/152, 73/84, 175/5, 175/41, 175/50, 175/65
[51] Int. Cl. ...................E21b 49/00, E21b 47/022
[58] Field of Search ....73/84, 151, 152, 143; 175/50, 175/40, 41, 67, 65, 5, 6, 7

[56] References Cited

UNITED STATES PATENTS

| 3,175,392 | 3/1965 | Tharalson et al. | 73/8 X |
| 3,186,223 | 6/1965 | Wilson | 73/152 |
| 3,251,424 | 5/1966 | Brooks | 175/65 X |
| 3,255,353 | 6/1966 | Scherbatskoy | 175/41 X |
| 3,324,717 | 6/1967 | Brooks et al. | 73/152 |
| 3,353,612 | 11/1967 | Bannister | 175/50 X |
| 3,370,656 | 2/1968 | Grolet et al. | 175/6 |
| 3,374,341 | 3/1968 | Klotz | 73/151 X |
| 3,384,192 | 5/1968 | Goodwin et al. | 175/67 X |
| 3,390,574 | 7/1968 | Jones | 73/151 X |
| 3,500,678 | 3/1970 | Vis | 73/8 X |
| 2,656,719 | 10/1953 | Webber | 73/143 |
| 3,426,844 | 2/1969 | McDaniel | 175/67 X |
| 3,508,439 | 4/1970 | Alger | 73/152 |

*Primary Examiner*—Richard C. Queisser
*Assistant Examiner*—Ellis J. Koch
*Attorney*—Richard E. Bee

[57] ABSTRACT

An instrument platform structure is lowered to the bottom of a body of water by means of a hoisting cable. A measuring instrument is lowered from the underwater platform structure by means of an instrument cable coupled to a spooling drum located on such underwater platform structure. The measuring instrument burrows its way into the water bottom soil by emitting water from water nozzles on the lower end of the instrument. The pressurized water is supplied to the nozzles by means of a water hose forming part of the instrument cable and a water pump mounted on the underwater platform structure. The measuring instrument includes various measuring devices such as penetrometers, nuclear radiation devices, etc., for making measurements indicative of physical characteristics of the soil adjacent the hole formed by the passage of the measuring instrument.

16 Claims, 8 Drawing Figures

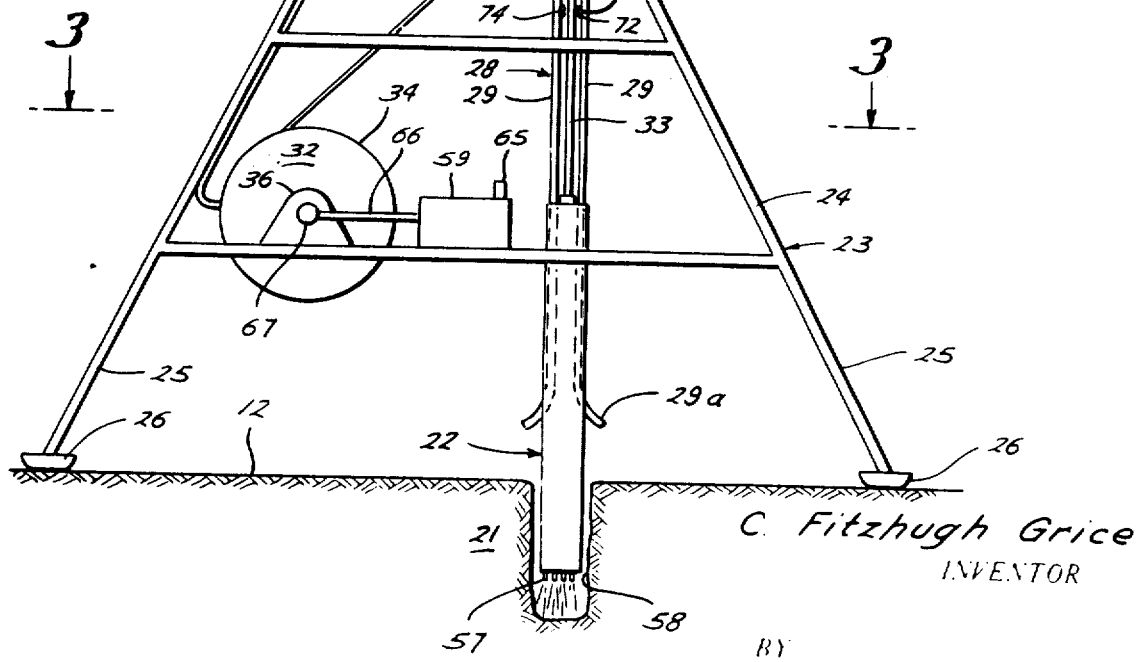

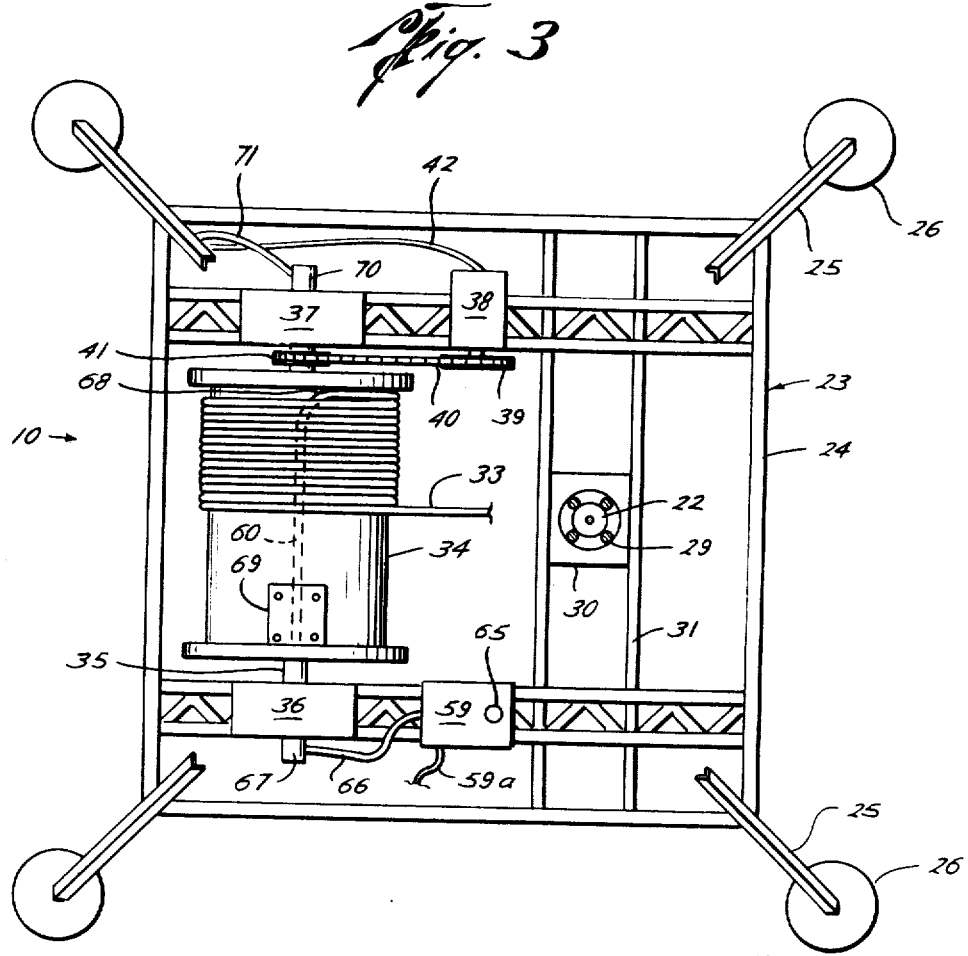
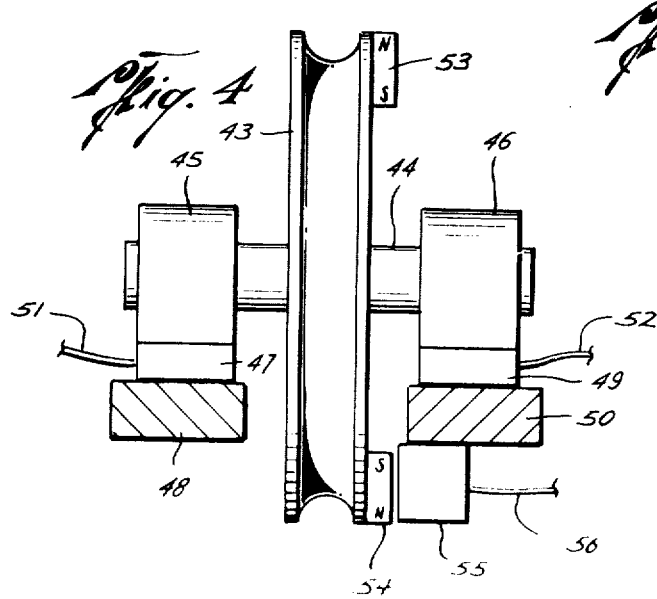
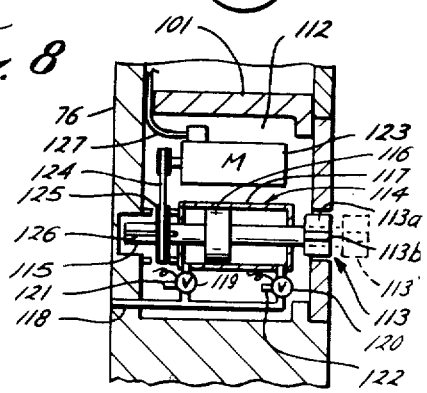
C. Fitzhugh Grice
INVENTOR
BY
Hayden Pravel Wilson & Matthews
ATTORNEYS

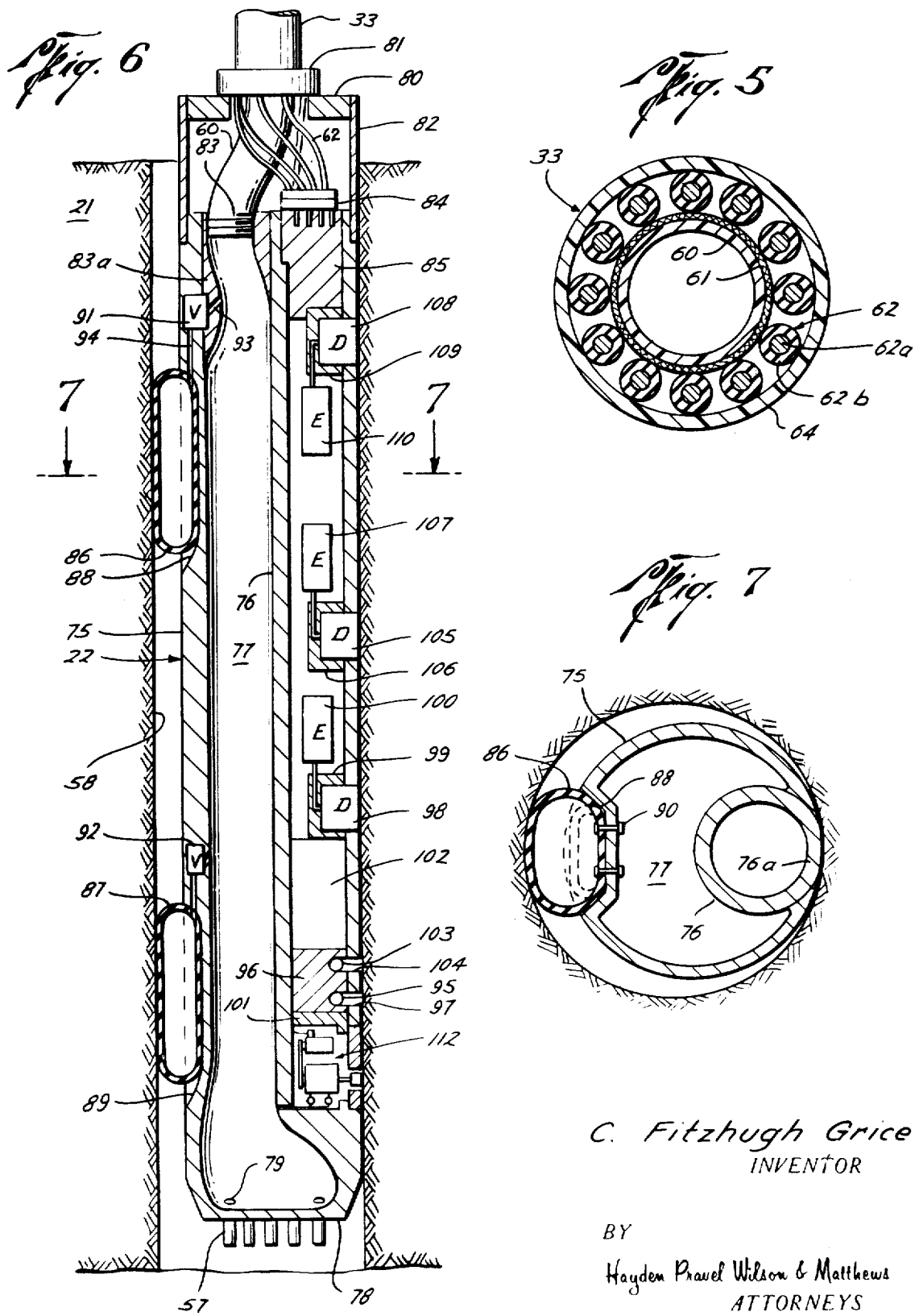

APPARATUS FOR MEASURING SUBSURFACE SOIL CHARACTERISTICS

BACKGROUND OF THE INVENTION

This invention relates to apparatus for measuring subsurface soil characteristics and is particularly useful in measuring the characteristics of soil underlying a body of water such as an ocean, a bay, a river, a lake, or the like.

It is becoming more and more common to support various above-water and underwater structures on the floor of an ocean or other body of water. In addition to the more generally known cases of offshore oil well drilling rigs, offshore navigation and radar platforms, over water highways and the like, various efforts are currently being made to construct various types of underwater habitation structures and underwater storage structures which will be supported from the floor of the ocean. In these various cases, both old and new, it is important to obtain accurate soil mechanics data concerning the water bottom soil. In many cases, such data should be obtained for all of the soil material extending from the ocean floor to a depth of some 100 to 150 feet below the ocean floor. Such data should include measurements relating to the shear strength, cohesiveness, density, compaction, moisture content, and the like of the sub-bottom soil material. This data enables an accurate engineering determination as to whether the ocean bottom soil will support the desired above-water or under-water structure, the holding power of the soil material with respect to support pilings driven therein, and so forth.

At the present time, there is no entirely satisfactory way of obtaining this information with respect to ocean bottom soil. One method that is sometimes used is to extract core samples from the water bottom soil and thereafter make tests on these core samples in a laboratory. This method requires the use of some form of drilling apparatus for drilling into the sub-bottom soil and extracting the core sample. As the depth of the water increases, the complexity and expense of the drilling apparatus increases. In addition, the measurements made on the core samples in the laboratory are not always entirely reliable because the soil material in such samples is no longer subject to its natural environmental conditions.

The latter objection can be overcome by making in situ measurements on the soil material without removing it from its sub-bottom location. It would be possible to do this by using so-called well logging techniques of the type used for oil well boreholes. This, however, would require the use of relatively expensive drilling equipment for drilling the hole into which the well logging device is to be lowered. In general, this approach would be too complex and too expensive where the measurements are to be made to a depth of only some 100 to 200 feet below the ocean floor.

There has been proposed the use of a self-propelled type of well logging instrument which is lowered to the ocean bottom from a floating vessel by means of an appropriate hoisting cable wherein such logging instrument has connected to the lower end thereof a drill bit and motor mechanism for enabling the instrument to dig its own way into the ocean bottom soil. The proposed instrument, however, suffers from various disadvantages which render it largely impractical for many of the situations in which it would be desired to use such instrument. For one thing, the progress of the instrument into the sub-bottom soil would be seriously hampered by the heave or rise and fall of the floating vessel with the ocean waves. This could be partly overcome by allowing some slack in the hoisting cable. This, however, would make it more difficult for the instrument to make its initial entry into the sub-bottom soil and would increase the chances that the instrument would dig a hole at a considerable angle to the desired vertical direction. Also, it would be very difficult, if not impossible, to correlate the measurements made by such an instrument with the sub-bottom depths at which such measurements were made. In addition, the proposed instrument does not provide any entirely satisfactory means for powering the drill bit motor mechanism capable of providing sustained underwater operations over any appreciable length of time. The proposed power source mechanisms are either too expensive, too cumbersome or are effective only for very short time intervals before they need be replenished.

Apart from the underwater uses, there is at the present time a general need for an improved form of soil testing instrument for land based or onshore use. Present techniques for use on land for obtaining soil mechanics data fall into two general categories. One involves the drilling of core holes and the taking of core samples from the subsurface soil, such core samples subsequently being subjected to laboratory type tests after they are retrieved at the surface. The second category relates to probe-type devices which are inserted a few feet into the earth and which are then operated to make the desired measurement. Unfortunately, the core hole methods do not provide in situ measurements, while the probe methods do not extend to any appreciable depth into the subsurface soil.

SUMMARY OF THE INVENTION

It is an object of the invention, therefore, to provide new and improved apparatus for obtaining in situ civil engineering type soil mechanics data for subsurface soil material to a substantial depth below the surface of the earth.

It is another object of the invention to provide new and improved apparatus for making in situ measurements of subsurface soil characteristics to a substantial depth below the surface of the earth, which apparatus does not require the use of conventional well drilling or core hole drilling equipment.

It is a further object of the invention to provide new and improved apparatus for measuring subsurface soil characteristics, which apparatus includes relatively efficient and relatively inexpensive means for enabling a measuring instrument to burrow its way into the earth.

It is an additional object of the invention to provide new and improved apparatus for measuring characteristics of the soil underlying a body of water, which apparatus substantially avoids one or more of the foregoing limitations of the methods and techniques heretofore utilized or proposed for this purpose.

It is a further object of the invention to provide new and improved apparatus for measuring the characteristics of ocean bottom soil, wherein there is provided a sub-bottom measuring instrument which can be operated from a floating vessel and which is not affected by the heave of the vessel with the ocean waves.

In accordance with one feature of the invention, apparatus for measuring characteristics of the soil underlying a body of water comprises a measuring instrument including means for enabling the instrument to burrow its way into the water bottom soil and means for making measurements on the soil adjacent the hole formed by the passage of the instrument. The apparatus also includes an instrument platform structure adapted to rest on the bottom of the body of water and including means for holding the measuring instrument before and after its journey into the water bottom soil and means for controlling the descent of the measuring instrument into the water bottom soil. The apparatus further includes cable means for enabling the instrument platform structure to be lowered from the surface of the body of water to the bottom thereof, such cable means being adapted to cooperate with appropriate above-water operating equipment.

In accordance with another feature of the invention, apparatus for measuring subsurface soil characteristics comprises an elongated measuring instrument including fluid jet means for emitting fluid from the lower portion of the instrument for enabling the instrument to burrow its way into the earth and measuring means for making measurements on the soil adjacent the hole formed by the passage of the instrument. The apparatus also includes fluid supply means located at the soil surface for supplying fluid under pressure. The apparatus further includes flexible fluid conduit means having one end coupled to the measuring instrument and communicating with the fluid jet means thereof and having the other end coupled to the fluid supply means, this conduit means being of sufficient length to enable the measuring instrument to descend to the desired depth.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 illustrates the use of a representative embodiment of the present invention for the case where the measurements are to be made on the soil underlying a body of water;

FIG. 2 is an enlarged elevational view of the underwater portion of the FIG. 1 apparatus;

FIG. 3 is a plan type cross-sectional view taken along section line 3—3 of FIG. 2;

FIG. 4 is an enlarged end view of a measuring wheel mechanism forming part of the underwater apparatus of FIG. 2;

FIG. 5 is a cross-sectional view of a flexible fluid conduit used with the underwater apparatus of FIG. 2;

FIG. 6 is an enlarged cross-sectional view of the sub-bottom soil measuring instrument associated with the FIG. 2 structure;

FIG. 7 is a horizontal cross-sectional view taken along section line 7—7 of FIG. 6; and FIG. 8 is an enlarged partially cross-sectional view of a penetrometer mechanism which is incorporated in the FIG. 6 instrument.

DESCRIPTION OF THE PREFERRED EMBODIMENT

Referring to FIG. 1, there is shown a representative embodiment of apparatus 10 for measuring characteristics of the soil underlying a body of water 11. The body of water 11 may be part of an ocean, a sea, a bay, a lake, a river, or the like. For sake of an example, it will be assumed that the body of water 11 is part of an ocean. In use, the apparatus 10 rests on the ocean floor or ocean bottom 12. In the present example, the underwater apparatus 10 is operated from a floating vessel represented by a boat 13. During the making of the sub-bottom soil measurements, the boat 13 remains as nearly stationary as is possible. As will be seen, however, minor movements of the boat 13, particularly the rising and falling thereof with the ocean swells, will not disturb the measurements.

The underwater apparatus 10 is lowered from the boat 13 by means of a hoisting cable 14. This cable 14 cooperates with appropriate above-water operating equipment 15 located on the boat 13. This above-water operating equipment 15 includes a spooling drum 16 operated by an appropriate winch mechanism (not shown) for reeling in and paying out the hoisting cable 14. After leaving the spooling drum 16, the cable 14 passes over a sheave wheel 17 mounted on a boom member 18 which extends over the back side of the boat 13. The above-water operating equipment 15 also includes electrical recording and control apparatus 19 for recording electrical measurement signals received from the underwater apparatus 10 and for supplying to the underwater apparatus 10 electrical operating power and various electrical control signals for controlling the operation of the underwater apparatus. To this end, the hoisting cable 14 includes as part thereof a number of insulated electrical conductors which run the length of the cable 14. As such, cable 14 may take the form of the armored multiconductor type of cable commonly used in logging oil well boreholes. The above-water ends of these cable conductors are electrically coupled to the recording and control apparatus 19 by way of a brush and slip ring assembly 20 associated with the spooling drum 16.

The recording and control apparatus 19 includes signal recording equipment for recording the electrical signals produced by the underwater measuring instrument and by various sensor mechanisms located on the main frame of the underwater apparatus 10. Apparatus 19 also includes various signal indicating devices and meters for providing immediate visual indications of various ones of these electrical signals to the operating personnel on the boat 13. Apparatus 19 further includes electrical power supply circuits and electrical control circuits for supplying electrical operating power and electrical control signals to the underwater apparatus 10.

As more or less indicated in the drawing, once the underwater apparatus 10 is in the desired location on the ocean floor 12, then an additional amount of the hoisting cable 14 is let off the spooling drum 16 so that a fair amount of slack is present in the underwater portion of the cable 14. This slack in the hoisting cable 14 keeps the heaving and pitching of the boat 13 from disturbing the operation of the underwater apparatus 10.

Referring now to FIGS. 2 and 3, there are shown enlarged elevational and plan-type cross-sectional views of the underwater apparatus 10. This underwater apparatus 10 includes a measuring instrument 22 and an instrument platform structure 23 which is adapted to rest on the bottom 12 of the body of water. The measuring instrument 22 is adapted to burrow its way into the sub-bottom soil 21 underlying the ocean floor 12. The instrument platform structure 23 includes a frame structure 24 having four downwardly extending leg members 25 equipped with foot pods 26 which rest on the ocean floor 12. The lower end of the hoisting cable 14 is coupled to the upper end of the instrument platform frame structure 24 by means of a swivel mechanism 27. An upper portion 27a of the swivel mechanism 27 is secured to the hoisting cable 14, while a lower portion 27b is secured to the frame structure 24. These upper and lower portions 27a and 27b are connected to one another by a rotary connection mechanism which allows rotation of one portion relative to the other. Included within the swivel mechanism 27 are appropriate rotary electrical connections for electrically connecting the conductors in the cable 14 to various insulated electrical conductors running from the lower portion 27b to various devices located on the frame structure 24. Swivel mechanism 27 may, for example, take the form of the swivel mechanism commonly used with oil well borehole logging instruments.

The instrument platform structure 23 further includes a vertical rack structure 28 secured to the frame structure 24 for holding the measuring instrument 22 before and after its journey into the water bottom soil 21. This rack structure 28 includes a set of four vertical guide rails 29 which are welded to vertically-spaced bracket plates one of which is indicated at 30 in FIG. 3. These bracket plates are in turn welded to cross-members 31 of the frame structure 24. The lower ends 29a of the guide rails 29 are flared or bent outwardly in radial directions to facilitate the return of the measuring instrument 22 into the rack structure 28.

The instrument platform structure 23 also includes means for controlling the descent of the measuring instrument 22 into the water bottom soil 21. This means includes spooling means 32 mounted on a lower portion of the frame structure 24 and an instrument cable 33, the unused portion of which is spooled thereon. The spooling means 32 includes a spooling drum 34 having a center shaft 35 (FIG. 3) which is rotatably journaled in a pair of drum mounts 36 and 37 (FIG. 3) located at opposite ends thereof. The spooling drum 34 is adapted to be rotated by means of an electric motor 38 which is linked therewith by means of a sprocket 39 mounted on the motor shaft, a continuous link type chain 40 and a sprocket 41 mounted on the center shaft 35 of the spooling drum 34. The electric motor 38 is energized by supplying electric power thereto by way of an electrical cable 42 which runs to the swivel mechanism 27 located at the top of the frame structure 24. Swivel mechanism 27 connects the conductors in the cable 42 to appropriate ones of the conductors in the hoisting cable 14 which, in turn, are coupled to the power supply unit located in the recording and control apparatus 19 on the boat 13.

After leaving the spooling drum 34, the instrument cable 33 passes over a measuring wheel 43 rotatably mounted on an upper portion of the frame structure 24 and then downwardly through the center of the rack structure 28 to the upper end of the measuring instrument 22, this end of the instrument cable 33 being coupled to the upper end of the measuring instrument 22.

An enlarged end view of the measuring wheel 43 is shown in FIG. 4. As there indicated, the measuring wheel 43 is mounted on a center shaft 44 which is rotatably journaled in a pair of mounting members 45 and 46. The mounting member 45 is secured to a load cell 47 which, in turn, is secured to a cross member 48 of the frame structure 24. The other mounting member 46 is secured to a second load cell 49 which, in turn, is secured to a second cross member 50 of the frame structure 24. The load cells 47 and 49 constitute a weight sensing mechanism for producing electrical signals indicating the tension on the portion of the instrument cable 33 extending from the measuring wheel 43 to the measuring instrument 22. To this end, the load sensitive electrical elements in the load cells 47 and 49 are coupled by way of electrical cables 51 and 52, respectively, to the swivel mechanism 27 located at the upper end of the frame structure 24. Swivel mechanism 27 couples the conductors in cables 51 and 52 to appropriate conductors in the hoisting cable 14, the upper ends of the hoisting cable conductors being coupled to an appropriate tension or weight indicating meter in the recording and control apparatus 19.

There is further associated with the measuring wheel 43 a movement sensing mechanism for producing electrical signals indicating the movement of the measuring instrument 22. This movement sensing mechanism includes small permanent magnets 53 and 54 which are secured to one side of the measuring wheel 43 at different points around the perimeter thereof. A cooperating sensing coil or pickup coil 55 is secured to the frame member 50 adjacent the path followed by the magnets 53 and 54 during the rotation of the measuring wheel 43. Pickup coil 55 detects the passage of the magnets 53 and 54 and generates an electrical pulse for each such occurrence. The showing of two magnets is by way of example only. A greater or lesser number can be used. Preferably, the number of magnets and the diameter of the measuring wheel 43 are selected so that the pickup coil 55 will produce an output pulse upon the completion of a one foot increment of movement of the measuring instrument 22.

The depth pulses produced by the pickup coil 55 are supplied by way of an electrical cable 56 to the swivel mechanism 27 located at the top of the frame structure 24. Swivel mechanism 27 couples the conductors in the cable 56 to appropriate conductors in the hoisting cable 14, the upper ends of the latter being coupled to the recording and control apparatus 19 in the boat 13. In the apparatus 19, these depth pulses can be used to control the chart advancing mechanism in the recorder which is recording the soil measurement signals. This causes such soil measurement signals to be recorded as a function of the depth of the measuring instrument 22 below the ocean floor 12. These depth pulses may also be used to drive an indicating device in the apparatus 19 which provides an indication of the rate of descent of the measuring instrument 22 into the sub-bottom soil material 21.

The measuring instrument 22 includes fluid-operated burrowing means for enabling the instrument 22 to burrow its way into the water bottom soil 21. In the illustrated embodiment, this fluid-operated burrowing means takes the form of fluid jet means for emitting fluid from the lower portion of the measuring instrument 22. This fluid jet means includes a plurality of downwardly extending jet nozzles 57 (FIG. 2) protruding in a downwardly direction from the lower end of the measuring instrument 22. The fluid being emitted from these jet nozzles 57 may be, for example, water under pressure. Such emitted water serves to wash away the soil material immediately below the lower end of the measuring instrument 22, thus allowing the measuring instrument 22 to descend into the hole 58 produced by such washing or jetting action. The high pressure water which is emitted from the nozzles 57 is obtained from a fluid supply means represented by a water pump 59 located on the instrument platform frame structure 24. Electric energy for operating the pump motor is supplied by cable 59a. The high pressure water is supplied to the measuring instrument 22 by means of the instrument cable 33. To this end, the instrument cable 33 includes a flexible fluid conduit which forms part thereof.

A cross-sectional view of the instrument cable 33 is shown in FIG. 5. With reference thereto, the flexible fluid conduit is represented by a fluid hose 60 which forms the interior portion of cable 33. This hose 60 may, for example, be formed of rubber material. The fluid hose 60 is surrounded by a layer of wire braid material 61 which is snugly fitted around the exterior thereof. This wire braid 61 helps provide the necessary mechanical strength for the cable 33. Located adjacent the wire braid material 61 are a number of insulated electrical conductors 62, each of which includes a conductor wire 62a covered with a layer of electrical insulation material 62b. An exterior covering layer 64 is provided for holding the insulated conductors 62 in place and for providing a smooth outer covering for the instrument cable 33. Such exterior covering layer may be formed of, for example, a tough, resilient plastic material.

As is now more apparent, the instrument cable 33 has a threefold purpose. It provides a mechanical link for use in raising and lowering the measuring instrument 22. It also provides a fluid link for supplying high pressure fluid from the instrument platform structure 23 to the measuring instrument 22. It further provides an electrical link between the measuring devices located in the measuring instrument 22 and the instrument platform structure 23.

Returning now to FIGS. 2 and 3 and considering in more detail the hydraulic system for supplying the high pressure water to the fluid hose 60 in the instrument cable 33, the water pump 59 takes water from the surrounding body of water by way of an intake pipe 65, increases the pressure thereof and then supplies same by way of an outlet hose 66 to a rotary hydraulic connector 67 mounted on the spooling mechanism 32. As indicated in FIG. 3, the end of the instrument cable 33 which is secured to the spooling drum 34 passes into the interior of the drum 34 by way of a cable opening 68. Inside of the spooling drum 34, the outer covering 64 (FIG. 5) is removed from the cable 33 and the fluid hose 60 and electrical conductors 62 are separated from one another. The fluid hose 60 passes through the interior of the drum 34 and is connected to a central passageway (not shown) in the drum shaft 35. This central passageway extends through the shaft 35 and makes a fluid connection with the rotary hydraulic connector 67. A removable access plate 69 is located at this end of the spooling drum 34 for enabling access to the interior of the drum 34 for purposes of fitting the end of the fluid hose 60 to the inlet of the passageway in the shaft 35. Appropriate hose fittings or couplings may be used for this purpose.

The various measuring devices in the measuring instrument 22 produce electrical signals indicative of such measurement. These signals are conveyed by way of various ones of the electrical conductors 62 in the instrument cable 33 to a rotary electrical connector 70 mounted on the other end of the center shaft 35 of the spooling drum 34. More particularly, after the instrument cable conductors 62 are separated from the instrument cable fluid hose 60 inside of the spooling drum 34, such conductors 62 pass through an inner passageway in the center shaft 35 to the rotary electrical connector 70. Connector 70 includes an appropriate brush and slip ring arrangement for electrically coupling the conductors 62 to a corresponding set of conductors in an electrical cable 71. Cable 71 is, in turn, coupled to the swivel mechanism 27 located at the upper end of the instrument platform frame structure 24. Swivel mechanism 27 connects the conductors in the cable 71 to a corresponding set of conductors in the hoisting cable 14 which runs to the ocean surface. At the ocean surface, these conductors in the cable 14 are electrically coupled by way of the brush and slip ring mechanism 20 to the recording and control apparatus 19. As a consequence, the recording equipment in the apparatus 19 provides a continuous record of the measurement signals produced by the measuring devices located in the measuring instrument 22. Electrical power for operating the various devices in the measuring instrument 22 is supplied to such devices by the power supply circuits in the apparatus 19 on boat 13, the transmission path being provided by additional ones of the conductors in cables 14, 71 and 33.

As indicated in FIG. 2, the vertical rack structure 28 is provided with a limit switch 72 near the upper end thereof, which limit switch 72 is connected by way of an electrical cable 73 to the swivel mechanism 27. Swivel mechanism 27 provides a rotary connection between the conductors in the cable 73 and a corresponding set of conductors in the cable 73 and a corresponding set of conductors in the hoisting cable 14. The upper end of these conductors in the hoisting cable 14 are coupled to an indicator device or warning device in the recording and control apparatus 19 for providing an indication as to when the measuring instrument 22 has reached the upper limit of travel in the rack structure 28. Rack structure 28 is further provided with a mechanical stop member 74 for preventing further upward movement of the measuring instrument 22. In use, the supplying of the operating energy to the electric motor 38 driving the spooling drum 34 is either discontinued or considerably reduced when the limit switch 72 indicates that the measuring instrument 22 has reached the upper end of the rack structure 28. If desired, an electrically-operated brake mechanism may be provided for the spooling drum 34 for braking same when the instrument 22 is in the rack structure 28. If further desired, an automatic control circuit can be provided for responding to the limit switch signal for automatically discontinuing the supplying of operating energy to motor 38 and for applying such spooling drum brake.

Referring now to FIG. 6, there is shown an enlarged cross-sectional view of the measuring instrument 22. As there indicated, the measuring instrument 22 comprises an elongated cylindrical housing 75 having an elongated fluid-tight cylindrical instrument compartment 76 of lesser diameter located inside thereof. Such compartment 76 is located in an ex-centered manner against one side of the housing 75. This ex-centered relationship is best seen in the horizontal cross-sectional view of FIG. 7. As there indicated, the instrument compartment 76 forms a complete circle and an outer portion 76a thereof extends through a portion of the wall of the main housing 75 so that the outer surface of the compartment 76 is in line with the outer surface of the housing 75 at the point of tangency. Compartment 76 is welded or otherwise secured to the housing 75 in such a manner as to maintain the watertight integrity of the interior of the housing 75.

As indicated in FIG. 6, the instrument compartment 76 extends in the vertical direction most of the length of the housing 75. The remainder of the interior of the housing 75 over the length which is coextensive with the compartment 76 provides a fluid passageway 77 which thus extends the length of the housing 75. The lower end of the fluid passageway 77 communicates with the fluid jet nozzles 57 which protrude from the lower end of the housing 75. More particularly, the lower end of housing 75 is sealed by a closure member 78 having a plurality of passageways 79 drilled therethrough. The jet nozzles 57 are mounted in these passageways 79 so that the interior fluid passageways in the nozzles 57 communicate with the fluid passageway 77 in the housing 75.

At the upper end of the housing 75, the lower end of the instrument cable 33 is mechanically connected to an upper closure member 80 by means of a cable coupling member 81. Coupling member 81 provides a fluid-tight seal between the instrument cable 33 and the upper closure member 80. Closure member 80 is, in turn, connected to a sleeve member 82 which is, in turn, connected to the upper end of the housing 75. Inside of the sleeve member 82, the electrical conductors 62 and the fluid hose 60 of the instrument cable 33 are separated from one another. The lower end of the fluid hose 60 is provided with a female hose coupling 83 which is screwed into a cooperating threaded passageway in an insert member 83a which closes off the portion of the upper end of the housing 75 which is exterior to the compartment 76. This construction provides a fluid-tight fluid connection between the hose 60 and the fluid passageway 77 in the housing 75.

The electrical conductors 62 are connected to the interior of the instrument compartment 76 by means of a plug and socket assembly 84. The plug portion of the assembly 84 is mounted on an upper closure member 85 which provides a fluid-tight closure for the upper end of the instrument compartment 76. Suitable conductor passageways are formed in the closure member 85 for enabling electrical conductors to pass from the plug and socket assembly 84 to the various measuring devices located within the instrument compartment 76.

The measuring instrument 22 further includes controllable off-centering means located on the exterior of the housing 75 on the side opposite the side to which the instrument compartment 76 is secured. This off-centering means includes inflatable means represented by inflatable expansion bags 86 and 87 which are mounted in recesses 88 and 89 formed in the exterior of the housing 75. As indicated in FIG. 7, the expansion bag 86 may be pinned to the inner wall of the recess 88 by suitable retaining pins 90. A similar construction is used for the lower expansion bag 87. The off-centering means further includes a pair of solenoid-controlled fluid flow control valves 91 and 92 mounted in the wall of the housing 75 for enabling the expansion bags 86 and 87, respectively, to be inflated by the pressurized water which is present in the fluid passageway 77 during the use of the measuring instrument 22. Flow control valve 91, for example, is coupled to an intake passage 93 which communicates with the housing passageway 77 and to an outlet passageway 94 which communicates with the interior of the expansion bag 86. A similar construction is provided for the lower valve 92. When valves 91 and 92 are open, fluid flows from the passageway 77 into the expansion bags 86 and 87 to inflate same. This inflation urges the measuring instrument 22 against the opposite side of the hole 58 in the soil material 21. Expansion bags 86 and 87 are shown in their inflated conditions in FIGS. 6 and 7. Electrical conductors (not shown) are provided for the control solenoids in the valves 91 and 92 for connecting same to appropriate conductors 62 in the instrument cable 33.

Considering now the various measuring devices located inside of the fluid-tight instrument compartment 76, these devices include a nuclear radiation type gamma-gamma density logging mechanism for measuring the density of the soil material adjacent the burrowed hole 58. This density logging mechanism includes a chemical-type gamma ray source 95 located in a block of gamma ray shielding material 96 located near the lower end of the compartment 76. Source 95 may be, for example, a pellet of cesium-137. A gamma ray transparent window 97 is formed in the outer wall of the compartment 76 to enable a collimated beam of gamma rays to be emitted into the adjacent soil material. The density logging mechanism further includes a gamma ray detector 98 located at a higher point in the instrument compartment 76. The portions of detector 98 within the compartment 76 are covered by a layer of gamma ray shielding material 99. This causes the detector 98 to be primarily responsive to gamma rays coming from the material in front of the detector 98, namely, the soil material on the side of the hole 58 against which the housing 75 is urged.

The rate of detection of gamma rays by the detector 98 is a function of the density of the soil material intermediate the source 95 and the detector 98. The denser the soil material, the lower the detection rate or counting rate. Associated with the detector 98 are electronic circuits 100 for energizing the detector 98 and for processing the detector signals to provide suitable signals for transmission to the above-water operating equipment located on the boat 13. Electronic circuits 100 may, for example, take the form of the circuits used in the gamma-gamma density logging instruments used in the oil well borehole logging art.

Located against the underside of the block 96 containing the gamma ray source 95 is a closure member 101 which provides a fluid-tight closure at this level in the compartment 76. Located between the upper side of the block 96 and the detector shield 99 is a cylindrical block of gamma ray shielding material 102. This block 102 functions to further reduce the possibility of the passage of gamma rays directly from the source 95 to the detector 98 through the interior of the compartment 76.

A second measuring device located in the compartment 76 is a nuclear radiation type neutron logging mechanism for measuring the water content of the soil material adjacent the burrowed hole 58. This neutron logging mechanism includes a chemical-type fast neutron source 103 located in the block 96. Neutron source 103 may be, for example, a pellet of radium-beryllium or polonium-beryllium or plutonium-beryllium. A neutron transparent window 104 is formed in the outer wall of the compartment 76. The neutron logging mechanism further includes a gamma ray detector 105 for detecting the capture gamma rays given off as the neutrons are captured by the soil material in the vicinity of such detector 105. The portions of detector 105 within the compartment 76 are covered by a layer of gamma ray shielding material 106 for rendering the detector 106 primarily responsive to the capture gamma rays coming from the side of the burrowed hole 58 on which the detector 105 is located.

Under most conditions, the rate of detection of the capture gamma rays by the detector 105 is a function of the water content of the soil material intermediate the neutron source 103 and the detector 105. In particular, the greater the water content, the lower the detection rate or counting rate. This is because the hydrogen atoms in the water are, by far, the most effective substance present for slowing down the neutrons, it being necessary to slow them down to the thermal level before the capture process can occur. The results of the measurement are quite accurate, provided the soil material does not contain any hydrocarbon material. If such material is present, the hydrogen therein has the same effect as the hydrogen in the water and the resulting measurements are no longer indicative of water content alone. Fortunately for present purposes, such hydrocarbon material is not likely to be encountered within the first hundred feet or so below the ocean floor.

Associated with the detector 105 are electronic circuits 107 for energizing the detector 105 and for processing the detector signals to provide suitable signals for transmission to the above-water operating equipment located on the boat 13. Electronic circuit 107 may, for example, take the form of the circuits generally used in nuclear logging instruments of the type used in logging oil well boreholes.

A further type of measuring device located in the compartment 76 is a nuclear radiation type natural gamma ray logging mechanism for measuring the natural radioactivity of the soil material. This natural gamma ray logging mechanism includes a gamma ray detector 108 located near the top of the instrument compartment 76 for detecting the natural gamma rays resulting from the natural radioactivity of the soil material. As is known, with respect to the most common kinds of soil materials, shales generally contain the greater concentration of radioactive salts. The shales are practically always considerably more radioactive than the sands and the other common types of soil material. Thus, the natural gamma ray logging mechanism indicates the presence and extent of the shales and, as such, provides an indication of the earth material lithology.

The part of the detector 108 which is located inside of the compartment 76 is covered by a layer of gamma ray shielding material 109 so that the detector 108 is primarily responsive to the natural gamma rays coming from the soil material in contact with the housing 75. Associated with the detector 108 are electronic circuits 110 for energizing the detector 108 and for processing the detector signals to provide suitable signals for transmission to the above-water operating equipment located on the boat 13. These circuits may take the form of those used in the oil well logging art.

Each of the gamma ray detectors 98, 105 and 108 may take the form of either a Geiger-Mueller counter or a scintillation counter.

An additional measuring device is located at the lower end of the compartment 76 below the water-tight partition 101. This measuring device is a penetrometer mechanism 112 for providing an indication of the mechanical shear strength of the adjacent soil material. The details of this penetrometer mechanism 112 are better seen in the enlarged view of FIG. 8. With reference to FIG. 8, the penetrometer mechanism 112 includes a probe element 113 which is adapted to be injected into the soil material adjacent the instrument housing 75. The probe element 113 is in the form of a pair of crossed plates 113a and 113b which are at right angles to one another to form a set of four vanes extending radially from the center point where the two plates cross one another. The vane element or probe element 113 is controlled by a double-acting hydraulic piston mechanism 114. In particular, the vane element 113 is mounted on a piston shaft 115 which is attached to a piston 116 which is located in a cylinder 117. High pressure hydraulic fluid, namely, water, is obtained from the fluid passageway 77 in the instrument housing 75 and is selectively supplied to the two sides of the piston 116 by way of a fluid line 118 and a pair of solenoid-operated three-way control valves 119 and 120. Valves 119 and 120 are provided with exhaust lines 121 and 122, respectively, which run to a lower pressure region exterior to the housing 75. These valves 119 and 120 are operated so that when valve 119 connects one end of the cylinder 117 to the high pressure feed line 118, the valve 120 connects the other end of the cylinder 117 to the low pressure exhaust line 122. In this condition, the piston 116 forces the vane element 113 into the adjacent soil material. When it is desired to retract the vane element 113 and return it to the compartment 76, the operation of the valves 119 and 120 are reversed. In particular, valve 120 is set to connect its end of cylinder 117 to the high pressure feed line 118, while valve 119 is set to connect its end of cylinder 117 to the low pressure exhaust line 121.

After the vane element 113 is injected into the adjacent soil material, it is caused to rotate and the amount of torque required to break down the soil material to enable this rotation is monitored. This provides a measure of the shear strength of the soil material. An extended position for the vane element 113 is indicated in outline at 113'. Rotation of the vane element 113 is produced by means of an electric motor 123 which is connected by way of a drive chain 124 to a drive disc 125 which is slidably mounted on the rear portion of the piston shaft 115. Drive disc 125 is provided with radial interior slots which cooperate with radially extending vanes 126 on the rearward portion of the piston shaft 115 for applying the desired rotary torque to the piston shaft 115. The engagement between the drive disc 125 and piston shaft 115 is slidable in nature to allow the sliding movement of the piston shaft 115 when ejecting or retracting the vane element 113.

Electrical energy for powering the motor 123 is supplied thereto by way of an electrical cable 127 which passes upwardly through a water-tight passageway in the partition 101 and is connected to the plug and socket assembly 84 located at the upper end of the compartment 76. This electrical energy is obtained from one of the power supply circuits in the recording and control apparatus 19 located on the boat 13, the necessary connections being provided by conductors in the cables 14, 71 and 33. The magnitude of the electrical energy, in particular, the electrical current, is recorded and monitored on the boat 113, the peak magnitude required to cause the breakdown of the soil material being indicative of the mechanical shear strength of such soil material.

If desired, a further monitoring mechanism can be provided for monitoring the force required to inject the vane element 113 into the soil material. Also, as an alternative, a solenoid type of driving mechanism can be used in place of the hydraulic piston mechanism 114 for purposes of ejecting and retracting the vane element 113.

OPERATION OF THE PREFERRED EMBODIMENT

Considering now the operation of the measuring apparatus of FIGS. 1–8, the underwater apparatus 10 is carried aboard the boat 13 to the location at which it is desired to make the ocean bottom soil measurements. Boat 13 is then brought to a standstill above such location. The measuring apparatus 10 is then lowered to the ocean floor 12 by means of the hoisting cable 14. After the apparatus 10 settles to rest on the ocean floor 12, an additional amount of the hoisting cable 14 is paid out to allow sufficient slack in such cable so that movements of the boat 13 with the ocean waves will not disturb the underwater apparatus 10. The water pump 59 on the underwater platform structure 23 is then turned on by closing the appropriate power supply switch in the recording and control apparatus 19 on the boat 13. This commences the emitting of the high pressure water from the jet nozzles 57 at the bottom end of the measuring instrument 22. The spooling drum motor 38 (FIG. 3) is then operated to cause the spooling drum 34 to commence the release of the instrument cable 33 and thus to lower the measuring instrument 22 towards the ocean floor 12. As the bottom end of the measuring instrument 22 approaches the ocean floor 12, the water jets from the nozzles 57 wash away the soil material immediately below the measuring instrument 22. This forms the hole 58 into which the measuring instrument 22 is allowed to settle. In this manner, the measuring instrument 22 burrows its way progressively deeper into the soil material 21 below the ocean floor 12. The action is similar to that of a garden hose which is pressed into the soil with the water running.

This burrowing action is allowed to continue until the measuring instrument 22 reaches the desired maximum sub-bottom depth. Such depth may be, for example, on the order of 100 to 150 feet below the surface of the ocean floor 12. The measuring instrument 22 is constructed to have sufficient weight to overcome the upward thrust caused by the water jets so that the measuring instrument 22 will continue to descend into the burrowed hole 58 as the instrument cable 33 is released from the spooling drum 34.

A preferred mode of controlling the descent of the measuring instrument 22 is to maintain a constant tension on the instrument cable 33 and to allow the measuring instrument 22 to find its own rate of descent into the soil material 21. The tension is held constant by observing the signals from the load cells 47 and 49 (FIG. 4) as supplied to the recording and control apparatus 19 and regulating the electrical energy supplied to the spooling drum motor 38 so as to hold the load cell signals at a constant value representing the desired instrument cable tension. When this is done, the rate of penetration of the measuring instrument 22 into the sub-bottom soil material becomes indicative of the character of the soil material. The softer the soil material, the faster the rate of penetration, while the harder the soil material, the slower the rate of penetration. The rate of penetration is indicated by the rate of occurrence of the depth pulses produced by the pickup coil 55 (FIG. 4) associated with the measuring wheel 43. Thus, with constant instrument cable tension, the depth pulses, when recorded against a time scale, provide a measure of the hardness or, more accurately, the degree of consolidation of the sub-bottom soil material.

Within limits, it is also feasible to use the converse mode of operation, namely, to hold constant the rate of penetration and to measure and record the variations in the tension on the instrument cable 33 which is required to maintain such penetration rate. The first mentioned mode of operation is, however, the preferred one.

With respect to the various measuring devices located inside of the measuring instrument 22, it is preferred that these devices make their measurements while the measuring instrument 22 is being withdrawn from the burrowed hole 58. To this end, these measuring devices are not activated during the downward burrowing operation of the instrument 22. Similarly, the inflatable expansion bags 86 and 87 (FIG. 6) on the instrument 22 are maintained in a deflated condition during the downward burrowing operation. After the measuring instrument 22 reaches the maximum desired depth below the ocean floor 12, then the various measuring devices in the instrument 22 are energized by supplying the appropriate operating energy thereto from the equipment on the boat 13. Also, at this time the solenoid-controlled valves 91 and 92 (FIG. 6) in the instrument 22 are operated to inflate the expansion bags 86 and 87. This urges the opposite side of the instrument housing 75 against the wall of the burrowed hole 58.

The nuclear radiation type logging mechanisms located in the instrument compartment 76 above the partition 101 are used to make continuous measurement as the measuring instrument 22 is withdrawn from the burrowed hole 58. The penetrometer mechanism 112, on the other hand, is used to make periodic measurements at spaced intervals during the withdrawal of the instrument 22. These penetrometer measurements may be made at, say, 5 or 10 foot intervals along the hole 58. It is, of course, necessary to temporarily stop the movement of the measuring instrument 22 when a measurement is being made with the penetrometer mechanism 112. Thus, at the desired intervals, the instrument 22 is halted and the penetrometer mechanism 112 is operated to push the vane element 113 into the adjacent soil material and then to apply torque to same until it breaks down the soil material and begins to rotate.

The various electrical measurements signals produced by the measuring devices in the instrument 22 are conveyed by way of the electrical conductors in the instrument cable 33 to the signal transfer equipment located on the underwater instrument platform structure 23. This signal transfer equipment includes the rotary electrical connector mechanism 70 (FIG. 3), cable 71 and the swivel mechanism 27. They serve to transfer the electrical measurement signals to the conductors in the hoisting cable 14, thus enabling same to be supplied to the recording and control apparatus 19 located on the boat 13. These various measurement signals are continuously recorded by one or more recorders located in the unit 19. They are recorded as a function of the depth of the measuring instrument 22 below the ocean floor 12. In this regard, the depth pulses provided by the underwater measuring wheel 43 not only provide the necessary depth signals for such recording purpose, but also further enable the operating personnel on the boat to be continuously informed of the depth of the measuring instrument 22 below the ocean floor 12.

As the measuring instrument 22 is withdrawn from the burrowed hole 58, it is returned to the rack structure 28 located on the underwater instrument platform 23. When the upper end of the measuring instrument 22 reaches the limit switch 72 (FIG. 2) at the upper end of the rack structure 28, the operating energy supplied to the spooling drum motor 38 (FIG. 3) is reduced to a level which is just sufficient to hold the instrument 22 in the rack 28 without overloading or damaging the motor 38. The underwater platform structure 23 is then ready to be moved to the next location to be surveyed. If this second location is not too far from the first location, then it is not necessary to raise the underwater instrument platform 23 completely out of the water. It is only necessary to raise it a few feet off the ocean floor and then move it to the second location.

The various measurements made with this apparatus yield considerable data concerning the nature and character of the sub-bottom soil material. As indicated, the rate of penetration measurement obtained during the downward burrowing process provides data on the degree of consolidation of the subsurface soil material. The periodic measurements made with the penetrometer mechanism 112 provide accurate in situ measurements of the mechanical shear strength of the sub-bottom soil material. The measurements made with the natural gamma ray logging mechanism (detector 108) provide information concerning the lithology and, in particular, the shaleness of the subsurface soil material. The measurements made with the neutron logging mechanism (source 103 and detector 105) provide an indication of the water content or degree of water saturation of the subsurface soil material. This information, together with the lithology information provided by the natural gamma ray logging mechanism, provides data from which an indication can be obtained of the cohesiveness of the sub-bottom soil material. This cohesiveness factor provides an indication of the ability of the sub-bottom material to adhere to and to hold in place foundation type footings and pilings for structures to be supported thereon, particularly underwater type structures. The measurements provided by the gamma-gamma density logging mechanism (source 95 and detector 98) provide an indication of the density of the sub-bottom soil material. From this density data, the porosity of the sub-bottom soil material can, if desired, also be determined.

These various measurements made with the various measuring devices in the instrument 22 provide the civil or structural engineer with considerable information concerning the mechanical and structural nature of the sub-bottom soil material. Such information is of considerable aid to him in the design of various above-water and underwater structures which are to be supported from the ocean floor.

The various measuring devices described above represent preferred measuring devices which can readily be used to perform the desired operations. It is not intended, however, that the invention should be limited to this particular set of measuring devices. Other measuring devices are presently available which can also be used to advantage. One example would be a sonic logging mechanism for measuring either the sonic travel time of acoustical energy through the soil material or the shear wave reaction of the soil material to radiated acoustical energy. It is also further contemplated that future developments in measuring device technology may lead to forms of measuring devices which are even more advantageous than those described herein. As such devices are developed, they can be incorporated in the measuring instrument 22, either by way of addition or in replacement of one or more of the measuring devices described above.

While the above described embodiment of apparatus was constructed for the particularly difficult case of making measurements on the soil material underlying a body of water, it should nevertheless be observed that this apparatus can be modified for purposes of making soil measurements on land. In particular, the spooling drum mechanism 32, the measuring wheel 43, the rack structure 28 and the water pump 59 of the underwater platform structure 23 can instead be mounted on the back end of a motor truck. In this case, the recording and control apparatus 19 would also be mounted on the motor truck. This equipment is then transported by the truck to the land-based location at which it is desired to make the soil measurements. The measurements are then made in much the same manner as described above, namely, by emitting high pressure water from the jet nozzles 57 and allowing the measuring instrument 22 to burrow its way into the earth. It is, of course, necessary that an adequate supply of water be available for use in providing the desired fluid jetting action. Such water supply can be provided by a water tank located on the truck. Also, by forming a small earthen dam surrounding the mouth of the burrowed hole, the water which is returned to the surface can be captured and again used by the water pump. Thus, the same water can be recirculated to provide a continuous supply of same, any water lost through seepage and the like being replinished by water from the water storage tank on the truck.

One further matter should be considered. On some occasions, the soil material will be so hard and so compact that it will be difficult for the measuring instrument 22 to make very rapid progress in burrowing its way into the earth. In these cases, an alternative form of burrowing mechanism can be used. In particular, a fluid-operated turbo-drill mechanism can be connected to the bottom end of the measuring instrument 22 in place of the water nozzles 57. This turbo-drill mechanism would be powered by the same high pressure water from the water pump 59. The drill bit associated with such turbo-drill mechanism would provide the necessary cutting action and would be capable of cutting through even very hard type earth material.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for measuring subsurface soil characteristics comprising:
   elongated cylindrical housing means;
   elongated compartment means located inside of the housing means in an ex-centered manner to one side thereof, at least part of the remainder of the interior of the housing means providing a fluid passageway which extends the length of the housing means;
   fluid-operated burrowing means located at the lower end of the housing means for enabling the housing means to burrow its way into the earth;
   measuring means located in the compartment means for making measurements on the soil adjacent the hole formed by the passage of the housing means;
   and coupling means located at the upper end of the housing means for enabling the fluid passageway therein to be coupled to means for supplying fluid under pressure.

2. Apparatus in accordance with claim 1 wherein the elongated compartment means comprises an elongated cylindrical compartment of lesser diameter than the elongated cylindrical housing means and wherein the elongated cylindrical compartment is contiguous with the inner wall of the cylindrical housing means along one side thereof.

3. Apparatus in accordance with claim 1 wherein the fluid-operated burrowing means comprises fluid jet means for emitting fluid from the lower end of the cylindrical housing means.

4. Apparatus in accordance with claim 1 wherein the fluid-operated burrowing means comprises turbo drill means coupled to the lower end of the housing means and communicating with the fluid passageway therein.

5. Apparatus in accordance with claim 1 wherein the fluid-operated burrowing means comprises a plurality of downwardly extending jet nozzles protruding from the lower end of the housing means and communicating with the fluid passageway therein.

6. Apparatus in accordance with claim 1 and further including controllable off-centering means located on the exterior of the housing means on the side opposite the side to which the compartment means is ex-centered for urging the compartment means side of the housing means against the wall of the burrowed hole when making a measurement on the adjacent soil.

7. Apparatus in accordance with claim 6 wherein the controllable off-centering means includes:
   inflatable means mounted on the exterior of the housing means;
   and valve means located within the housing means and communicating with both the fluid passageway therein and the inflatable means for enabling fluid in such passageway to inflate the inflatable means.

8. Apparatus in accordance with claim 1 wherein the measuring means includes a plurality of measuring devices for making a plurality of different types of measurements on the soil adjacent the hole formed by the passage of the housing means.

9. Apparatus in accordance with claim 1 wherein the measuring means includes a penetrometer mechanism having a probe element adapted to be injected into the soil adjacent the burrowed hole for providing an indication of the mechanical shear strength of such soil.

10. Apparatus in accordance with claim 1 wherein the measuring means includes a vane-type penetrometer mechanism having a vaned element adapted to be injected into the soil adjacent the burrowed hole and adapted to be rotated for providing an indication of the mechanical shear strength of such soil.

11. Apparatus in accordance with claim 1 wherein the measuring means includes nuclear radiation means for providing an indication of a physical characteristic of the soil adjacent the burrowed hole.

12. Apparatus in accordance with claim 1 wherein the measuring means includes:
   a penetrometer mechanism having a probe element adapted to be injected into the soil adjacent the burrowed hole for providing an indication of the mechanical shear strength of such soil;
   and nuclear radiation means for providing an indication of a physical characteristic of the soil adjacent the burrowed hole.

13. Apparatus in accordance with claim 1 wherein:
   the fluid-operated burrowing means comprises fluid jet means for emitting fluid from the lower end of the housing means;
   the measuring means includes a penetrometer mechanism having a probe element adapted to be injected into the soil adjacent the burrowed hole for providing an indication of the mechanical shear strength of such soil;
   the measuring means further includes nuclear radiation means for providing an indication of a physical characteristic of the soil adjacent the burrowed hole;

and the apparatus further includes controllable off-centering means located on the exterior of the housing means on the side thereof opposite the side to which the compartment means is ex-centered for urging the compartment means side of the housing means against the wall of the burrowed hole when making a measurement on the adjacent soil.

14. Apparatus for measuring characteristics of the soil underlying a body of water comprising:

a platform structure adapted to rest on the bottom of the body of water;

cable means for cooperating with appropriate above-water operating equipment for lowering the platform structure from the surface of the body of water to the bottom thereof;

an elongated cylindrical housing having fluid jet means for emitting fluid from the lower portion thereof for enabling the housing to burrow its way into the water bottom soil and a fluid passageway located within the housing and extending from the upper end of the housing to the fluid jet means for supplying fluid thereto;

fluid supply means located on the platform structure for supplying pressurized fluid;

flexible fluid conduit means having one end coupled to the upper end of the fluid passageway in the housing and having the other end coupled to the fluid supply means;

conduit handling means located on the platform structure for controlling the movement of the flexible fluid conduit means for controlling the descent and ascent of the housing into and out of the water bottom soil;

and measuring means located in the housing for making measurements on the soil adjacent the hole formed by the passage of the housing into the water bottom soil, such measuring means being located inside of compartment means located inside of the housing in an ex-centered manner to one side thereof.

15. Apparatus in accordance with claim 14 and further including controllable off-centering means located on the exterior of the housing on the side opposite the side to which the compartment means is ex-centered for urging the compartment means side of the housing against the wall of the burrowed hole when making a measurement on the adjacent soil.

16. Apparatus for measuring characteristics of the soil underlying a body of water comprising:

a platform structure adapted to rest on the bottom of the body of water;

cable means for cooperating with appropriate above-water operating equipment for lowering the platform structure from the surface of the body of water to the bottom thereof;

an elongated cylindrical housing having fluid jet means for emitting fluid from the lower portion thereof for enabling the housing to burrow its way into the water bottom soil and a fluid passageway located within the housing and extending from the upper end of the housing to the fluid jet means for supplying fluid thereto;

fluid supply means located on the platform structure for supplying pressurized fluid;

flexible fluid conduit means having one end coupled to the upper end of the fluid passageway in the housing and having the other end coupled to the fluid supply means;

conduit handling means located on the platform structure for controlling the movement of the flexible fluid conduit means for controlling the descent and ascent of the housing into and out of the water bottom soil;

measuring means located in the housing for making measurements on the soil adjacent the hole formed by the passage of the housing into the water bottom soil, such measuring means including nuclear radiation means for providing an indication of a physical characteristic of the soil adjacent the burrowed hole and a penetrometer mechanism having a probe element adapted to be injected into the soil adjacent the burrowed hole for providing an indication of the mechanical shear strength of the soil, such nuclear radiation means and penetrometer mechanism being located inside of compartment means located inside of the housing in an ex-centered manner to one side thereof;

and controllable off-centering means located on the exterior of the housing on the side opposite the side to which the compartment means is ex-centered for urging the compartment means side of the housing against the wall of the burrowed hole when making a measurement on the adjacent soil.

* * * * *